United States Patent [19]

Bianchetta et al.

[11] 4,011,920

[45] Mar. 15, 1977

[54] SYNCHRONIZED VEHICLE FLUID DRIVE SYSTEM

[75] Inventors: Donald L. Bianchetta, Coal City; Jesse L. Field, Jr., Braidwood, both of Ill.

[73] Assignee: Caterpillar Tractor Co., Peoria, Ill.

[22] Filed: Aug. 25, 1975

[21] Appl. No.: 607,511

[52] U.S. Cl. .............................. 180/6.48; 60/484; 60/486

[51] Int. Cl.² ................................... B62D 11/04

[58] Field of Search ............... 180/6.48, 44 F, 6.3, 180/66 R; 60/421, 427, 484, 486

[56] References Cited

UNITED STATES PATENTS

| | | | |
|---|---|---|---|
| 2,942,421 | 6/1960 | Hann et al. | 60/421 |
| 2,980,193 | 4/1961 | Baudhuin et al. | 60/421 |
| 3,161,246 | 12/1964 | Meeker et al. | 180/44 F |
| 3,655,004 | 4/1972 | Hoashi | 180/6.48 |

*Primary Examiner*—Joseph F. Peters, Jr.
*Assistant Examiner*—John A. Pekar
*Attorney, Agent, or Firm*—Charles E. Lanchantin, Jr.

[57] ABSTRACT

A synchronized vehicle fluid drive system includes a vehicle, a pair of hydraulic motors operative to drive the opposite sides of the vehicle, a dual source of fluid pressure, a pair of open loop circuits individually communicating with the sources of fluid pressure and individually having a distributor valve for selectively communicating its respective fluid pressure source with one of said motors for operation thereof, and an equalizing line disposed in fluid communication intermediate the open loop circuits for assuring that the input flow to each of the motors is substantially the same when straight line travel of the vehicle is desired. Advantageously, a blocking valve may be disposed in the equalizing line for deactivating it upon receiving a steering signal.

5 Claims, 2 Drawing Figures

SYNCHRONIZED VEHICLE FLUID DRIVE SYSTEM

BACKGROUND OF THE INVENTION

A variety of vehicles including farm tractors, track-driven excavators and the like, employ matching hydraulic systems which individually incorporate an operatively associated pump and a motor for driving the opposite sides thereof for maneuvering purposes. While these hydraulic drive systems are generally very effective, most of these vehicles have a tendency to veer or drift from a straight line course because of the problems of synchronizing the drive motors.

In the past, in order to assure straight line travel of the vehicle, sophisticated and expensive mechanisms have been developed to mechanically connect the pumps together so that equal flow will be directed to the vehicle driving motors. However, these mechanisms require precise and frequent adjustment because of external wear thereof and also because of internal wear of the pumps and motors. Furthermore, valve leakage variations are simply not taken into account by such mechanisms. These mechanisms are designed to be ineffective when turning the vehicle or otherwise steering it away from a straight line course which adds significantly to their complexity.

Because these hydraulically operated vehicles employ a number of hydraulically operated implements, it is desirable to power such auxiliary equipment by utilizing the same fluid systems associated with the motors for propelling the machine. Consequently, for maximum effectiveness and economy of operation, open loop circuits are frequently utilized and any synchronizing technique that is used to assure straight line travel of the vehicle must be compatible with the operation of these open loop circuits and their associated auxiliary equipment.

SUMMARY AND OBJECTS OF THE INVENTION

In accordance with the present invention a synchronized vehicle drive system is provided which is particularly adaptable to a hydraulic excavator. It includes a pair of open loop circuits individually having a pump, vehicle drive motor and a distributor valve communicating fluid therebetween, and with an equalizing line cross-connecting the inlet conduits to the drive motors to balance flow thereto when straight line vehicle travel is desired. Advantageously, a blocker valve may be disposed in the equalizing line to interrupt such flow upon making a steering correction.

Accordingly, an object of the present invention is to provide an improved fluid drive system which is better able to synchronize rotation of a pair of motors for driving the opposite sides of a vehicle when straight line travel is desired.

Another object of the invention is to provide such an improved fluid drive system which is compatible with a pair of open loop circuits individually having a pump which is operatively associated with one of the drive motors so that auxiliary equipment can be operated therewith.

Another object of this invention is to provide a synchronized drive system of the character described which is not only simple and economical in its construction, but also is relatively ineffective during turning of the vehicle.

Other objects and advantages of the present invention will become more readily apparent upon reference to the accompanying drawings and following description.

DESCRIPTION OF THE BASIC EMBODIMENT

Figure 1:
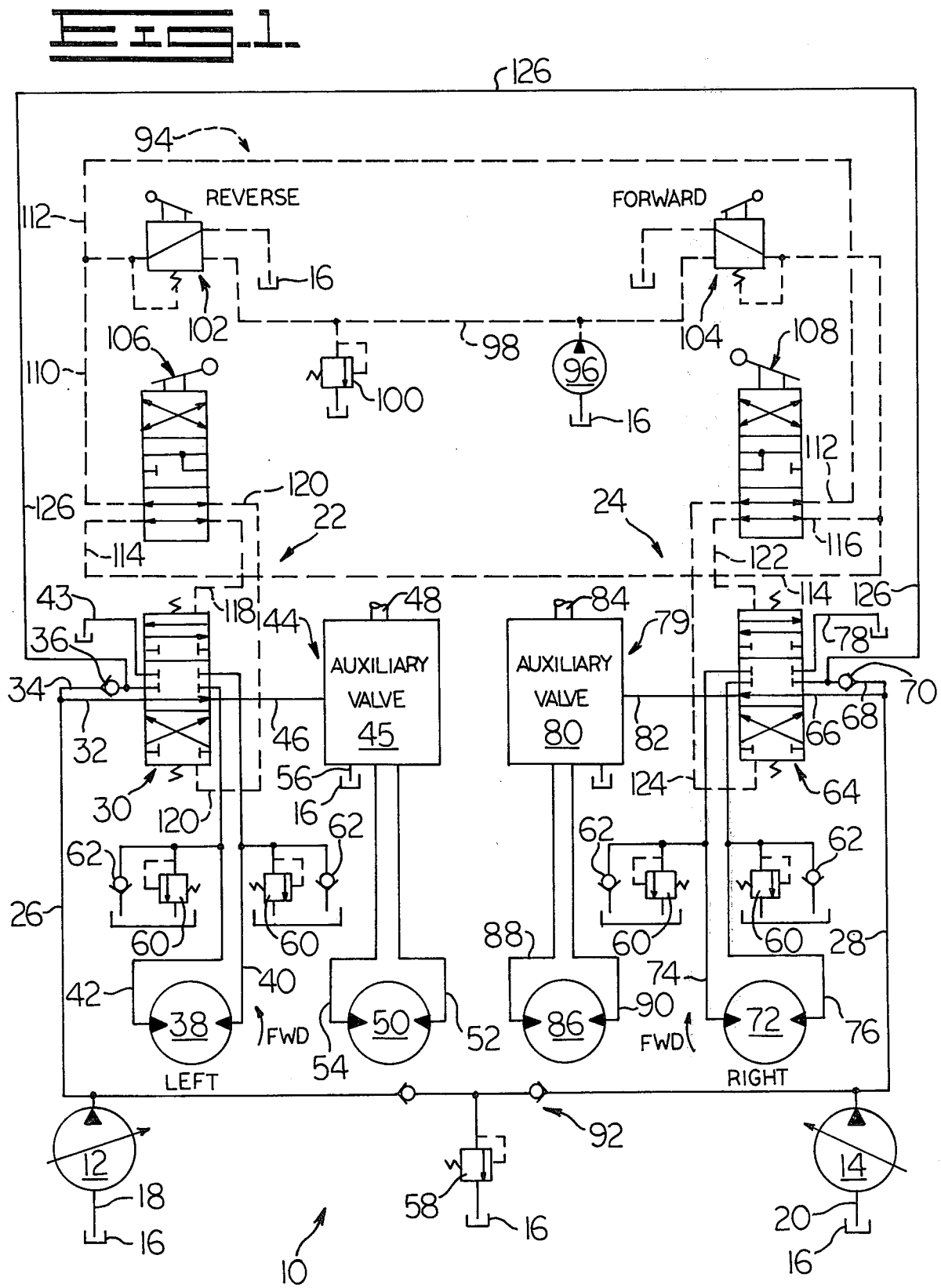
FIG. 1 is a schematic illustration of a vehicle fluid drive system including a pair of open loop circuits individually adaptable for operation of a vehicle drive motor and auxiliary equipment and incorporating a basic embodiment of the present invention.

Referring initially to FIG. 1, a synchronized fluid drive system embodying the basic principles of the present invention is generally indicated by the reference numeral 10 and is adapted for propelling a vehicle, not shown, such as a track-type excavator or the like. Such fluid drive system includes a pair of suitably powered, variable capacity pumps 12 and 14, which draw fluid from a tank or reservoir 16 through individual inlet conduits 18 and 20. Each of these pumps supplies fluid pressure to one of a pair of separate open loop circuits 22 and 24 via a conduit 26 and a conduit 28, respectively.

The open loop hydraulic circuit 22, disposed generally at the lower left when viewing FIG. 1, includes a distributor valve 30 which is in fluid communication with the conduit 26 through a branch conduit 32 and a drive motor supply conduit 34 having a load check valve 36 in series therewith. This distributor valve is pilotably moved to modulatably and reversibly deliver fluid to a vehicle drive motor 38 operatively associated with the left side of the vehicle through either one of a pair of conduits 40 and 42, and with the other conduit being placed in return communication with the reservoir 16 through a drain conduit 43. It is to be noted that the distributor is open centered and in such position, as illustrated, fluid flow is uninterruptably supplied to an auxiliary circuit 44 including an auxiliary valve 45 by way of a connecting conduit 46. Accordingly, the auxiliary valve may be selectively operated as by manipulation of a selector valve spool 48 to permit modulated and reversible fluid delivery from the pump 12 and conduit 46 to an auxiliary motor or hydraulic jack 50 through a pair of conduits 52 and 54. Although not shown, the auxiliary valve includes suitable relief, make-up and check valves of the usual type therein, and which are in communication with the conduit 46 or conduit 56 leading back to the reservoir 16; to enable accurate and safe control of the auxiliary motor even though it is heavily loaded.

It may thus be appreciated that the valves 30 and 45 are disposed in interrupted series relation, wherein if the upstream distributor valve 30 is moved from the open center position shown to either of its maximum displacement positions, fluid is supplied first to the drive motor 38, with no fluid being available to the downstream connecting conduit 46. With this arrangement and full flow to the vehicle drive motors, the operator would not have the ability to rob either motor of its respective fluid and thus throw the vehicle into an unexpected turn upon operation of the auxiliary equipment. Of course, it is to be understood that the auxiliary valve can be made open center also to allow delivery of fluid to yet another similar valve and motor, not shown, in the same interrupted series manner to further utilize the capacity of pump 12 for operating additional implements on the vehicle.

In a conventional manner the pump 12 is protected from over-pressurization through a main relief valve 58 set, for example, to relieve fluid back to the reservoir 16 at 280 Kg. per sq cm (4000 psi). Furthermore, the drive motor conduits 40 and 42 are similarly protected against high pressure by way of a pair of relief valves set at approximately 340 Kg. per sq cm (4800 psi) and generally designated by the reference numeral 60, and are protected against cavitation by way of a pair of make-up valves indicated by the reference numeral 62.

As is apparent when viewing FIG. 1, the second open loop circuit 24 is substantially a mirror image of the first circuit 22 described immediately above. It, likewise, includes a distributor valve 64 coupled to the pressurized conduit 28 through a branch conduit 66 and drive motor supply conduit 68 having a load check valve 70 therein. The second distributor valve is thus positionable to allow fluid delivery to a second vehicle drive motor 72 operatively associated with the opposite or right side of the vehicle through either one of a pair of conduits 74 and 76, with the return fluid being communicated back to the reservoir 16 through a drain conduit 78. In the centered position of this distributor valve, flow from the second pump 14 is delivered to an auxiliary circuit 79 having an auxiliary valve 80 by way of an interconnecting conduit 82. In a manner similar to that described above with respect to the first auxiliary circuit 44, movement of a selector valve spool 84 associated with the auxiliary valve 80 permits fluid delivery selectively to an auxiliary motor or hydraulic jack 86 via a pair of conduits 88 and 90.

It is evident that the second vehicle drive motor conduits 74 and 76 are protected by relief valves 60 and make-up valves 62 similar to those protecting the first vehicle drive motor 38 and similar reference numerals have been applied thereto. Furthermore, the outlet of the second pump 14 is arranged to be in fluid communication with the main relief valve 58 through a check valve apparatus 92 which operatively serves to separate the second pump from the first pump 12 and yet to allow common use of this relief valve.

In the illustrated embodiment of FIG. 1, the distributor valves 30 and 64 are spring-centered to their open center positions, and are independently moved therefrom by a manually operated pilot circuit 94 disposed in the upper portion of the drawing for selectively operating the vehicle drive motors 38 and 72. These reversible motors are respectively disposed on the left and right sides of the vehicle, as mentioned above, for driving the opposite tracks of the hydraulic excavator, not shown. By operating the tracks at the same speed and in the same direction straight line driving is provided, whereas by appropriately operating the opposite tracks at varying speeds and/or in different directions, pivot or even spot movement of the excavator is achieved for maneuvering purposes in a well known manner. To enable remote operation of the distributor valves in order to obtain such vehicle movement, the relatively low pressure pilot circuit 94 is utilized, and in this connection, it is noted that the pilot conduits are generally illustrated by broken lines.

More particularly, the pilot circuit 94 includes a pilot pump 96 which draws fluid from the reservoir 16 and supplies it to a supply conduit 98 whose pressure is established at a value of approximately 20 Kg. per sq cm (300 psi) by a relief valve 100. A first directional pilot valve 102 and a second directional pilot valve 104 are connected to the supply conduit 98 and are manually operated to respectively permit reverse or forward operation of the vehicle. Thereafter, the first directional pilot valve is connected to a first steering pilot control valve 106 via a conduit 110 and to a second steering pilot control valve 108 via a conduit 112, while the second directional pilot valve is in fluid communication with the same steering pilot control valves through a conduit 114 and a conduit 116, respectively. Subsequently, with manual positioning of the first steering pilot control valve 106, pilot pressure is selectively directed to the opposite ends of the first distributor valve 30 by way of either a signal conduit 118 or a signal conduit 120, and to the opposite ends of the second distributor valve 64 by way of either a signal conduit 122 or 124 to bias either one of, or both of the distributor valves away from their open center positions and to direct operating fluid to the vehicle drive motors 38 and/or 72.

Pursuant to the present invention, provision is made to equalizably couple the pressurized supply conduits 34 and 68 which direct fluid to the vehicle drive motors 38 and 72, respectively for improved straight line driving of the vehicle. This is effectively accomplished by cross-connecting a synchronizing or equalizing line 126 between these supply conduits intermediate the load check valve 36 and the first distributor valve 30 on the one end, and intermediate the load check valve 70 and the second distributor valve 64 on the other end. Consequently, upon selective operation of either of the directional pilot valves 102 or 104 by the vehicle operator, and in the absence of any steering correction by either of the steering pilot control valves 106 or 108, the distributor valves simultaneously move away from their open centered positions approximately the same degree to deliver fluid to both of the drive motors. It is at this time that the synchronizing line 126 tends to equalize pressure in both of the drive motor supply conduits 34 and 68 by limitedly allowing flow to be delivered in either direction through the line to the supply conduit with the lowest pressure. This assures substantially equal flow to the vehicle drive motors and essentially straight-line vehicle travel. In accordance with one aspect of the invention, the synchronizing line is preferably of smaller internal size than the drive motor supply conduits to provide certain flow restricting characteristics thereto. This will decrease the effect that the line will have on the distributor valves during modulated movement thereof, and increase the sensitivity of the circuits upon making minor steering corrections.

OPERATION

While the construction and operation of the present invention is believed clearly apparent from the foregoing description, further amplification will subsequently be made in the following brief summary of the operation thereof. With the distributor valves 30 and 64 in the position shown, and with the vehicle stationary, it is to be appreciated that selective manipulation of either of the selector valve spools 48 and 84 will allow movement of the auxiliary motors 50 and 86 through the auxiliary valves 45 and 80, respectively. On the one hand the first auxiliary motor receives fluid flow from the first pump 12 by way of the conduit 26, the branch conduit 32 and the connecting conduit 46, while on the other hand the second auxiliary motor receives fluid from the second pump 14 by way of the conduit 28 the branch conduit 66 and connecting conduit 82. In this way the open loop circuits 22 and 24, respectively, permit reversible operation of the auxiliary motors through manipulation of the auxiliary valves and it is to be noted that this is achieved without influencing the vehicle drive motors 38 and 72. At this same time, the synchronizing line 126 is effectively isolated from the circuits because each of its ends is connected to the supply conduits 34 and 68 upstream of a distributor valve and downstream of the load check valves 36 and 70, respectively. Consequently, the synchronizing line cannot deleteriously affect operation of these auxiliary motors.

When forward movement of the vehicle is desired in a straight line, the second directional pilot valve 104 is depressed to communicate pressure from the pilot supply conduit 98 to both of the conduits 114 and 116, which are also communicating with the steering pilot control valves 106 and 108. In the straight-ahead position of the steering pilot control valves illustrated, the conduits 114 and 116 are directly opened to the signal conduits 118 and 122, respectively. Therefore, the pilot pressure acts upon the top of both of the distributor valves 30 and 64 when viewing the drawing to urge them downwardly. Subsequently, fluid pressure in the drive motor supply conduit 34 from the first pump 12 is communicated through the load check valve 36 to the conduit 42 and the first drive motor 38 for powering it in the forward direction, and with the return flow from the drive motor being communicated back to the reservoir 16 through the conduits 40 and 43. In a similar manner, flow from the second pump 14 is communicated through the drive motor supply conduit 68 and load check valve 70 to the conduit 76 of the second drive motor 72 to cause it to also rotate in a forward direction, and with the return fluid being communicated back to the reservoir through the conduits 74 and 78. In such traveling condition, the synchronizing line 126 advantageously serves to balance the pressures in the drive motor supply conduits to achieve substantially equal flow to both drive motors.

Operation of the vehicle in reverse is similar to forward operation in that with depression of the first directional pilot valve 102, fluid is modulatably delivered from the pilot supply conduit 98 to the conduits 110 and 112. Such pressure signals are respectively communicated through the steering pilot control valves 106 and 108 to the conduits 120 and 124, whereupon the distributor valves 30 and 64 are biased upwardly from the positions shown. Subsequently the drive motor supply conduits 34 and 68 communicate openly with the opposite conduits 40 and 74 of the drive motors 38 and 72, respectively, to cause them to rotate in a reverse direction and at substantially the same rate because of the desirable action of the synchronizing line 126 as described above.

With the second directional pilot valve 104 actuated to achieve forward movement of the vehicle in a substantially straight line as discussed above, either pivot turns or spot turns may be made to the left or right through the appropriate manipulation of the steering pilot control valves 106 and 108, respectively. For example when a left pivot turn of the vehicle is desired, the steering pilot control valve 106 is manually actuated towards its central position to thereupon block any pressure in the conduit 114 thereat. Simultaneously, both of the signal conduits 118 and 120 are interconnected within the steering pilot control valve 106 to the signal conduit 110 which is in open communication with the reservoir 16 through the other directional pilot valve 102. Consequently, the distributor valve 30 is spring returned to its open centered position whereupon the flow to the first drive motor 38 is blocked. On the other hand, the opposite steering pilot control valve 108 remains in the position illustrated so that the pressure in the signal conduit 116 is still communicated to the second distributor valve 64 to bias it downwardly so that the second drive motor 72 continues rotating in its forward mode of operation. With the drive motor on the left side blocked, and the drive motor on the right side moving in a forward direction, a pivot turn of the vehicle to the left is achieved.

In the same manner, when a spot turn to the left is desired the steering pilot control valve 106 is further manually depressed when viewing the drawing so that the conduits 110 and 118, as well as the conduits 114 and 120 are cross-connected so that the distributor valve 30 is moved upwardly when viewing the drawing in an opposite manner to the downward movement of the opposite distributor valve 64. In this way the first drive motor 38 is caused to rotate in reverse, while the opposite drive motor 72 is still operating in its forward mode. This enables rapid spot turning of the vehicle.

DESCRIPTION OF AN EXPANDED EMBODIMENT

Since the synchronizing line 126 limitedly communicates both of the drive motor supply conduits 34 and 68 of the open loop circuits 22 and 24, respectively, some loss in steering sensitivity may be affected by flow of fluid from the higher pressure conduit to the lower pressure conduit during a turn. Consequently, it may be desirable to incorporate a blocking valve arrangement 128 in the synchronizing line as shown in the expanded embodiment illustrated in FIG. 2. Upon inspection of FIG. 2, it will be seen that the majority thereof is similar to FIG. 1, and identical reference numerals have been utilized for designating similar elements.

Figure 2:
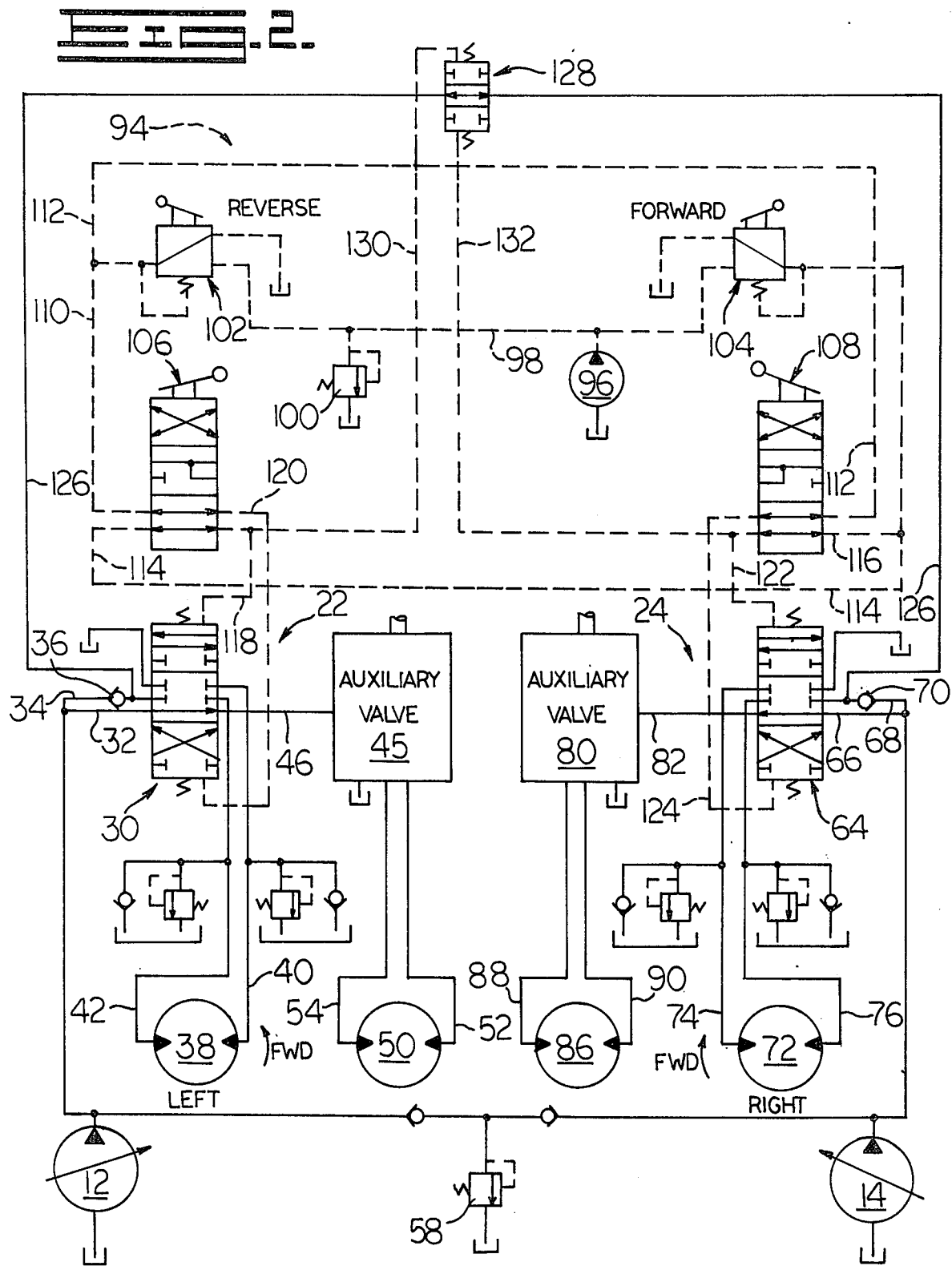
FIG. 2 is a schematic illustration of a vehicle fluid drive system similar to FIG. 1, only incorporating an expanded embodiment of the present invention.

Referring now to the three-position blocking valve arrangement 128 shown in FIG. 2, however, it is to be noted that in its illustrated central position substantially uninterrupted flow of fluid is communicated by the synchronizing line to the drive motor supply conduits 34 and 68, respectively. The blocking valve arrangement is spring-centered to this position and is moved away therefrom by a pressure differential across a pair of steering signal conduits 130 or 132 communicating with the opposite ends thereof. These signal conduits are connected in parallel with the signal conduits 118 and 122, respectively, which lead to the upper portions of the distributor valves 30 and 64. Accordingly, when the vehicle is traveling in straight forward or reverse and the signal conduits 118 and 122 are respectively both pressurized or depressurized as discussed previously, then the signal conduits 130 and 132 reflect these same conditions at the blocking valve arrangement and it remains centered. On the other hand, when making a steering correction by manipulating one of the modulatable steering pilot control valves 106 or 108 from the positions illustrated in FIG. 2, a pressure change is experienced in one of the signal conduits 130 or 132 so that a pressure differential is felt across the blocking valve arrangement. In this way a steering signal is effected to the blocking valve arrangement whereupon it is moved away from its central position to a position interrupting flow through the synchronizing line. This will prevent any balancing of the pressures in the drive motor supply conduits and increase the sensitivity of the system, particularly at the low end of any steering correction.

In view of the foregoing, it is readily apparent that the structure of the present invention provides a fluid drive system which is better able to synchronize rotation of a pair of drive motors operatively associated with the opposite sides of a vehicle for improved straight-line driving thereof. Moreover, it is evident that such system is compatible with a pair of open loop circuits so that auxiliary motors can be operated by utilizing the same pumps which run the vehicle drive motors. Furthermore, the system is economical and positive in its operation, and is relatively ineffective during steering movements of the vehicle.

While the invention has been described and shown with particular reference to a basic embodiment and an expanded embodiment, it is apparent that variations might be possible that would fall within the scope of the present invention, which is not intended to be limited except as defined in the following claims.

What is claimed is:

1. A synchronized vehicle fluid drive system comprising;
   a vehicle;
   a pair of motors operative to drive the opposite sides of said vehicle;
   a pair of pressure supplying fluid pumps;
   a pair of open loop circuits individually communicating one of said pumps with one of said motors through an open center distributor valve for operation thereof, each of said circuits also having a supply conduit with a load check valve therein upstream of said distributor valve, and
   a synchronizing line disposed in fluid communication between said supply conduits of said open loop circuits connectably intermediate each of said load check valves and said distributor valves at the opposite ends thereof for equalizing fluid flow to said motors and to assure straight line travel of said vehicle when desired.

2. A synchronized vehicle fluid drive system comprising;
   a vehicle;
   a pair of motors operative to drive the opposite sides of said vehicle;
   a pair of pressure supplying fluid pumps;
   a pair of open loop circuits individually communicating one of said pumps with one of said motors through an open center distributor valve for operation thereof, each of said circuits also having a supply conduit with a load check valve therein upstream of said distributor valve,
   an auxiliary circuit individually arranged in fluid communication with one of said open loop circuits downstream of said distributor valve, with said auxiliary circuit having auxiliary valve means therein for selectively directing fluid to an associated fluid motor for operation thereof, and
   a synchronizing line disposed in fluid communication between said supply conduits of said open loop circuits connectably intermediate each of said load check valves and said distributor valves at the opposite ends thereof for equalizing fluid flow to said motors and to assure straight line travel of said vehicle when desired without deleteriously influencing operation of said auxiliary circuit.

3. The synchronized vehicle fluid drive system of claim 2 including a second auxiliary circuit arranged in fluid communication with the other one of said open loop circuits downstream of said distributor valve, and said second auxiliary circuit also having auxiliary valve means therein for selectively directing fluid to an associated fluid motor for operation thereof.

4. The synchronized vehicle fluid drive system of claim 2 including a blocker valve disposed in series with said synchronizing line to interrupt flow of fluid therethrough upon receiving a steering signal thereto.

5. The synchronized vehicle fluid drive system of claim 4 including pilot circuit means for effecting selective modulated movement of said distributor valves for operation of said motors, and wherein said pilot circuit means includes a pair of steering signal conduits adaptable to communicate a pressure differential across said blocker valve for moving it away from a centered position and thereby interrupting flow of fluid through said synchronizing line.

* * * * *